May 29, 1951     J. F. VOGEL     2,554,801
AUXILIARY SAFETY TRAILER HITCH AND STABILIZER
Filed March 29, 1948

INVENTOR.
Julius F. Vogel
BY
Wayland D. Keith
HIS AGENT

Patented May 29, 1951

2,554,801

UNITED STATES PATENT OFFICE 2,554,801

AUXILIARY SAFETY TRAILER HITCH AND STABILIZER

Julius F. Vogel, Burkburnett, Tex.

Application March 29, 1948, Serial No. 17,678

6 Claims. (Cl. 280—33.4)

This invention relates to improvements in auxiliary safety trailer hitch and stabilizer and more particularly to a safety trailer hitch and stabilizer that can be utilized to furnish an auxiliary connection between a conventional trailer, such as is usually towed behind an automotive vehicle, and the automotive vehicle.

Heretofore great difficulty has been experienced in towing trailers evenly at high speeds, due to the side sway of the trailer. Furthermore, the danger of the trailer becoming disconnected was always present which made the use of a trailer behind an automotive vehicle dangerous both to life and property.

In the present invention provision has been made to stabilize the trailer against side sway and also a safety hitch has been provided that will prevent the tongue from dropping to the ground, should the conventional trailer hitch or the tongue become broken or disconnected. In such an event, the tongue and trailer also are prevented sidewise movement sufficient to cause damage, until the vehicles can be brought to a stop.

The primary object of this device is to provide an auxiliary safety trailer hitch and side sway stabilizer that will maintain the trailer in true trailing alignment with the tow vehicle, while being driven at high speeds, and that will prevent the trailer becoming disconnected from the tow vehicle.

Another object of this device is to provide a safety trailer hitch and side sway stabilizer that will prevent the conventional trailer hitch and trailer tongue from reaching the ground should the trailer become disconnected from the tow vehicle.

Yet another object of the present device is to provide a safety trailer hitch and side sway stabilizer that is easy to make and install, that is inexpensive, and that will function effectively under all conditions.

An embodiment of this device is illustrated in the accompanying drawings, in which.

Figure 1:
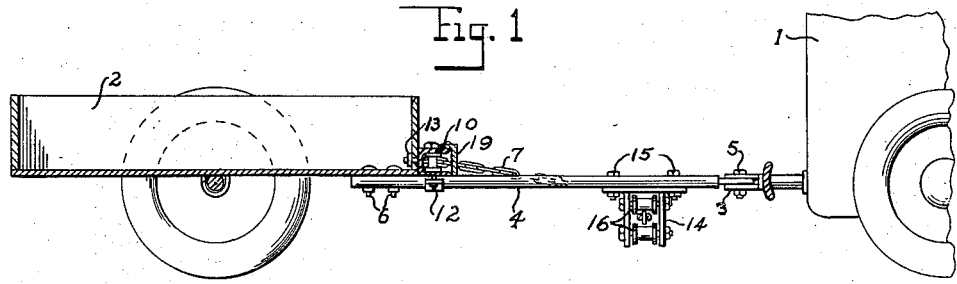
Fig. 1 is a side elevational view of a trailer and the rear portion of a motor vehicle, showing the device as used in conjunction with a conventional trailer hitch, with parts shown in section.

For purposes of illustration, the safety hitch and side sway stabilizer is shown as used between a two-wheel trailer and a conventional automobile, and used in conjunction with the conventional tow bar and trailer hitch. It is to be understood however, that the device is readily adaptable to almost any tow and towed vehicles.

With more detailed reference to the drawing, the numeral 1 designates a motor vehicle to which is attached, in the conventional manner, a trailer generally designated at 2. The motor vehicle is provided with the usual trailer hitch 3, which is adapted to receive the end of the tongue 4 of the trailer. The tongue 4 is attached to the hitch 3 by means of bolts 5 or other suitable connecting devices well known in the art.

The tongue 4 is connected to the trailer 2 by bolts 6, thus the tongue 4, hitch 3 and bolts 5, or other fastening means, comprise a conventional connection between the motor vehicle 1 and the trailer 2.

However, in order to prevent damage to the vehicles and contents, should the bolts become broken or worn in two, or the tongue break, an auxiliary safety hitch and side sway stabilizer has been provided, and comprises a chain 7 having a safety hook 20 at either end thereof, which hooks are received by eyes 8 positioned on the rear of the motor vehicle. In the form illustrated, these eyes are shown as attached to the conventional bumper. It is preferable that the eyes 8 be spaced equidistant from the trailer hitch, which hitch would normally be positioned in the center of the bumper, as illustrated, or other frame member, for a different application.

With one end of the chain 7 hooked into one of the eyes 8, the chain is extended rearward and passed around spools 9 which are mounted within a channel frame 10 that is attached to the lower front end of the trailer 2, in such manner that, with the other end of the chain 7 hooked into the other eye 8, the sides of the chain are parallel, and each reach thereof is parallel to the tongue 4. The chain should be of such length as to be comparatively tight when secured in place as described above.

The spools 9 are journaled upon bolts 11 so that they are free to turn upon movement of the chain therearound. The frame structure 10 may be made in any desired shape, however, it is shown as constructed of channel, which is securely fastened to the tongue 4 by a clamp 12 and to the forward end of the trailer by bolts 13. This gives a simple construction that is easy to make and install, yet one which is sufficiently sturdy to withstand the strain to which it will be subjected.

With the auxiliary hitch positioned in place as described above, a connection is maintained between the tow vehicle and the towed vehicle, even though the trailer hitch 3 may become broken or the bolt 5 sheared.

Figure 4:
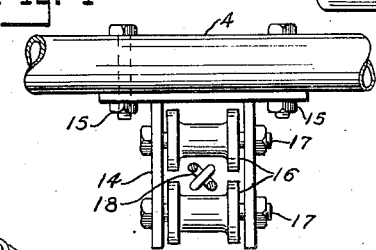
Fig. 4 is an enlarged fragmentary elevational view of the dual spool arrangement as attached to the underside of the conventional tow bar.
Figure 3:
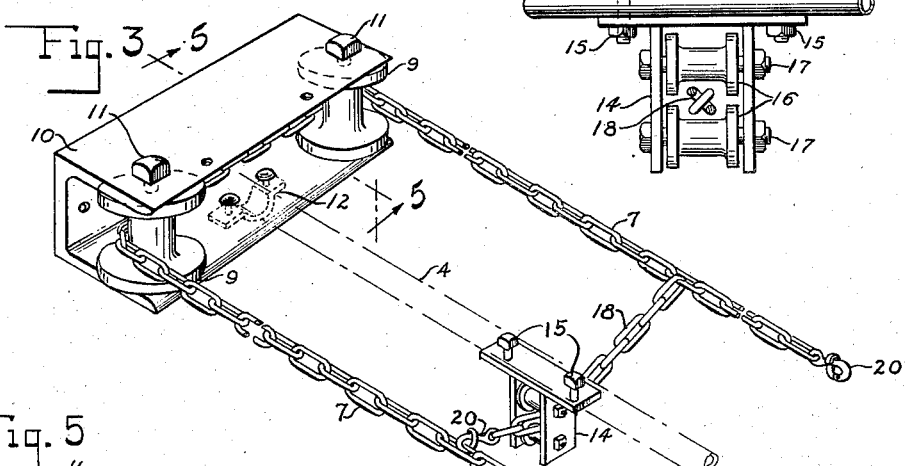
Fig. 3 is a perspective view of the device removed from the vehicles, with parts removed, broken away and shortened, to illustrate the details of construction.
Figure 5:
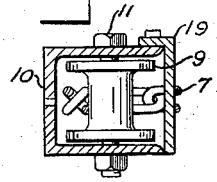
Fig. 5 is a sectional view taken on the line 5—5 of Fig. 3.

A frame member 14 is positioned beneath the tongue 4 and is secured thereto by means of bolts 15, as will best be seen in Fig. 4. The frame member 14 has downwardly extending parallel bars between which are fitted rollers 16, which rollers are journaled on bolts 17. This bracket frame member is positioned on the tongue approximately one-third the distance between the vehicles, being closer to the motor vehicle than to the trailer.

A cross chain 18 is adapted to connect between the parallel reaches of the chain 7 and to pass between the spaced rollers 16, as will best be seen in Fig. 4. These rollers are so spaced as to be rotated by the movement of the chain 18 passing therebetween. With the chain 18 so positioned, the tongue 4, should it become disconnected, will be supported and prevented from digging into the ground or striking the tow vehicle. The chain 18 has sufficient slack to permit the normal operation of the trailer, as in turning, but is sufficiently tight to support the tongue and prevent it dropping to the ground in case it becomes disconnected from the motor vehicle.

Figure 2:
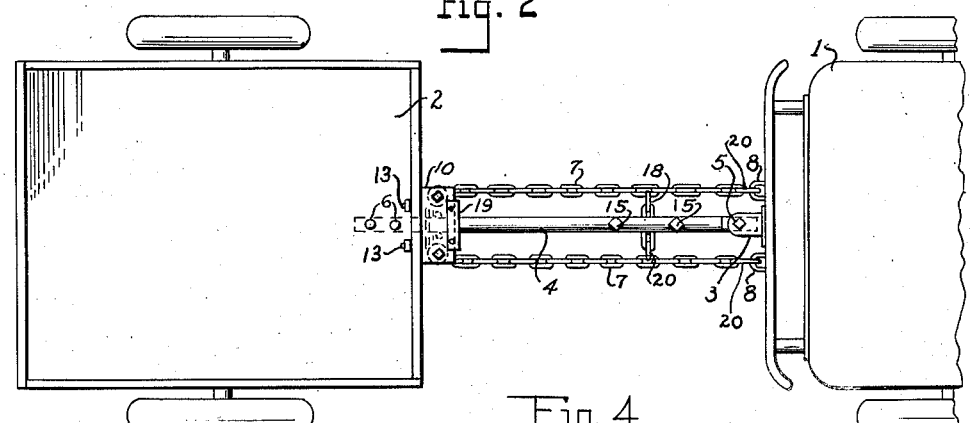
Fig. 2 is a top plan view of a trailer and the rear portion of a motor vehicle, showing the auxiliary safety hitch installed therebetween and used in conjunction with a conventional hitch.

A cover 19 is provided for the channel frame 10 to close the open side thereof, and which cover plate may be secured in place in any suitable manner, such as by bolts or by welding. This cover plate protects the chain 7 from being fouled by rocks, mud and other foreign matter from being thrown into the mechanism by the swiftly moving wheels of the vehicles. The channel frame member is sufficiently short to allow the chain 7 to pass out at either end thereof, as will best be seen in Fig. 2.

It is to be pointed out that the channel frame mechanism and the fastening means therefor, are particularly arranged so that there will be no projections upon which the chain could catch and thus become inoperative.

Figure 6:
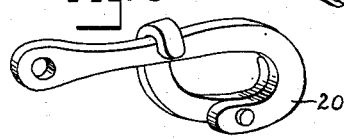
Fig. 6 is a perspective view of a safety hook used to secure the present device in proper operating position.

While any type fastening may be used for connecting the chain 7 to the eyes 8 and to connect the cross chain 18 with one of the reaches of the chain 7, I have shown a safety hook 20, which hook is shown in detail in Fig. 6. This hook is well adapted to the purpose, but I do not wish to limit myself to any specific type hook. The hook shown is illustrative, and there are other type hooks that may be used advantageously.

In the operation of the device, the trailer and the motor vehicle are attached together by the conventional tongue and hitch. The chain 7 is then secured in place as described above, as is the chain 18.

With the chain 18 secured in place between the spools 16, and secured to the parallel reaches of the chain 7 at points directly opposite each other, the tongue 4 is held suspended, should it accidentally become disconnected from the hitch, and thus damage and accident incident to such an occurrence is prevented.

With the two lines of pull of the chain 7 so close together and to the center line of the vehicles, the wobble or side sway of the trailer is reduced to the minimum, and the pull on the load is balanced. Also, with the chain 7 free to rotate with spools 9, it can compensate for turns, uneven travel surfaces and the like. In actual practice, in the form illustrated, the applicant has found that the distance between the spools 9 on the channel member and between the eyes on the bumper of the motor vehicle, that gives the best results is fourteen inches. Obviously, however, this space can be varied according to the vehicles used and still give effective results, and it is to be understood that the applicant does not wish to confine himself to any specific number of inches between the parallel reaches of the auxiliary trailer hitch and sway stabilizer. The chain 7 is comparatively taut after it is secured in place, and there is, therefore, little likelihood of its becoming sufficiently slack to catch or foul, but all precautions have been taken to eliminate any protruding mechanism or the entrance of foreign matter that could conceivably bring about such an occurrence.

This device has been found to be particularly useful as an auxiliary safety hitch and stabilizer on trailers used for transporting livestock, because it does prevent side sway of the trailer and damage or loss of the trailer and contents, should the convention hitch fail to function. This is just one of the many uses to which this device is adaptable.

Having thus described the invention, what is claimed is:

1. In an auxiliary trailer hitch and stabilizer, the combination of a trailer having a conventional tow bar attached thereto, a motor vehicle having a conventional trailer hitch thereon, and means for attaching said tow bar and said trailer hitch, an auxiliary trailer hitch and side sway stabilizer comprising a frame member secured to the front of said trailer and to the tow bar attached thereto, said frame member having rotatably mounted thereon a pair of spools, which spools are so positioned as to be substantially equidistant on either side of the point of attachment of said tow bar, a looped flexible element capable of being passed about said spools and extending to said motor vehicle, safety means for attaching the ends of said flexible element to said motor vehicle at points substantially equidistant on either side of said trailer hitch, a further flexible element interconnecting between the reaches of first mentioned flexible element within the length thereof and positioned to support said tow bar in event of disconnection thereof.

2. In an auxiliary trailer hitch and side sway stabilizer the combination of a trailer having a conventional tow bar attached thereto, a motor vehicle having a conventional trailer hitch thereon, and means for attaching said tow bar with said trailer hitch, an auxiliary trailer hitch and side sway stabilizer comprising a frame member secured to the trailer and to the tow bar connected thereto, said frame member having rotatably mounted thereon a pair of spools, which spools are so positioned as to be equidistant on either side from the point of attachment of said tow bar, a looped flexible element capable of being passed around said rotatable spools and extending in substantially parallel reaches to the tow vehicle, safety hooks on either end of said flexible element, and means for attaching said safety hooks to said tow vehicle, means on said tow bar and each of the reaches of said first mentioned flexible element for the support of said tow bar in event it becomes disconnected from the tow vehicle.

3. In an auxiliary trailer hitch and side sway stabilizer the combination of a trailer having a conventional tow bar attached thereto, a motor vehicle having a conventional trailer hitch thereon and means for attaching the tow bar and the trailer hitch together, an auxiliary safety hitch and side sway stabilizer comprising a frame member secured to the trailer and to the tow bar attached thereto, a pair of spools rotatably mounted on said frame member in such position as to be equidistant from the point of attachment of said tow bar and comparatively close thereto, a flexible member having fastening means on either end thereof, which flexible member is adapted to pass about said rotatable spools and extend in parallel reaches to said tow vehicle, means for attaching said fastening means to said tow vehicle, a frame member secured to the underside of said tow bar and forward of the center thereof, said frame member having rotatably mounted thereon a pair of spools, a transverse chain attached to one reach of the flexible member and extending between the spaced spools on said tow bar bracket, and fastened to the opposite reach of the cable, the two points of fastening of said transverse chain being substantially opposite each other.

4. In combination with a trailer and a motor vehicle secured together by a conventional trailer hitch and tow bar, an auxiliary trailer hitch and side sway stabilizer comprising a pair of rotatable spools mounted on said trailer, a looped flexible member passing about said rotatable spools and extending forward therefrom to a pair of eyes on said motor vehicle, safety means for securing the respective ends of the cable to the respective eyes, said eyes being so positioned and said spools being so positioned on the respective vehicles so that the reaches of said flexible member are substantially parallel and comparatively close to the conventional tow bar, flexible means and interconnected with the reaches of said first mentioned flexible member forward of the mid point of said reaches of said first mentioned flexible member for supporting said tow bar should it become disconnected.

5. In an auxiliary trailer hitch for connecting a trailer to a traction vehicle, a flexible member secured to the traction vehicle and having reaches extending rearwardly therefrom and passing around a pair of roller elements positioned on said trailer, said roller elements being secured on either side of a tongue connecting said trailer and said traction vehicle, a transverse chain adapted to connect said reaches of said flexible element forward of the mid point between said trailer and said traction vehicle to support said tongue should it become disconnected.

6. In an auxiliary trailer hitch for connecting a traction vehicle to a trailer, said trailer having a rigid, forwardly extending tow bar for pivotal connection with said traction vehicle, a frame member adapted to be rigidly secured on said trailer and carrying a pair of roller elements having rigid, fixed axes relative to said frame member and spaced relatively close to said tow bar and fixed relative thereto, a looped flexible element adapted to pass around said roller elements with the ends thereof to extend forward in substantially parallel relation to connect with said traction vehicle, a further flexible element forward of a point midway of said reaches and positioned to support said tow bar upon disconnection thereof.

JULIUS F. VOGEL.

REFERENCES CITED

The following references are of record in the file of this patent:

UNITED STATES PATENTS

| Number | Name | Date |
| --- | --- | --- |
| 1,460,564 | Ashley | July 3, 1923 |
| 2,085,260 | Keys | June 29, 1937 |
| 2,196,115 | Jacobson | Apr. 2, 1940 |
| 2,225,130 | Otto et al. | Dec. 17, 1940 |
| 2,378,297 | Hetzler | June 12, 1947 |